United States Patent
Infiesto

(10) Patent No.: US 6,453,259 B1
(45) Date of Patent: *Sep. 17, 2002

(54) VEHICLE ENTERTAINMENT SYSTEM HAVING BUILT-IN TEST ENVIRONMENT SERVER

(75) Inventor: Douglas C. Infiesto, Chino Hills, CA (US)

(73) Assignee: Rockwell Collins, Inc., Cedar Rapids, IA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/336,638

(22) Filed: Jun. 18, 1999

(51) Int. Cl.7 .............................................. G06F 19/00
(52) U.S. Cl. ..................... 702/122; 345/2.1; 345/741; 370/395.52; 370/452; 455/3.06; 473/131; 701/33; 701/48; 702/121
(58) Field of Search ................. 702/122, 121, 702/123; 701/33; 345/2, 327; 370/395; 713/201; 709/230, 250

(56) References Cited

U.S. PATENT DOCUMENTS

| | | | | |
|---|---|---|---|---|
| 5,184,312 A | * | 2/1993 | Ellis | 702/121 |
| 5,541,863 A | * | 7/1996 | Magor et al. | 702/122 |
| 5,563,550 A | * | 10/1996 | Chartrand | 473/131 |
| 5,568,484 A | * | 10/1996 | Margis | 370/452 |
| 5,659,614 A | * | 8/1997 | Bailey | 713/165 |
| 5,790,787 A | * | 8/1998 | Scott et al. | 709/250 |
| 5,928,362 A | * | 7/1999 | Cardillo et al. | 713/200 |
| 5,933,136 A | * | 8/1999 | Brown | 345/741 |
| 5,959,596 A | * | 9/1999 | McCarten et al. | 345/2.1 |
| 6,014,381 A | * | 1/2000 | Troxel et al. | 370/395.52 |
| 6,058,288 A | * | 5/2000 | Reed et al. | 455/3.06 |
| 6,112,246 A | * | 8/2000 | Horbal et al. | 709/230 |
| 6,161,071 A | * | 12/2000 | Shuman et al. | 701/48 |
| 6,202,008 B1 | * | 3/2001 | Beckert et al. | 701/33 |
| 6,212,640 B1 | * | 4/2001 | Abdelnur et al. | 713/201 |

FOREIGN PATENT DOCUMENTS

EP          0890907 A1 *  1/1999

OTHER PUBLICATIONS

US Patent Application S/N 09/085,180, filed May 26, 1998, Infiesto et al.
Kedrosky, Paul, "The internet in flight", Jun. 1, 1998, Forbes, v161, n11, p. S32.*
Warwick, Graham, "Intranet in is sky is planned", Oct. 14, 1998, Flight International.*
"SingTel lines up new saterllite services", Feb. 5, 1997, Singapore Business Times, p. 14.*

* cited by examiner

Primary Examiner—John S. Hilten
Assistant Examiner—John Le
(74) Attorney, Agent, or Firm—Nathan O. Jensen; Kyle Eppele

(57) ABSTRACT

Line or shop replaceable units (LRUs or SRUs) of a vehicle entertainment system are programmed as microservers to receive and carry out requests for testing the LRUs/SRUs from a browser connected to the LRUs/SRUs over a communications network of the vehicle entertainment system. Test results are transmitted back to the browser for display. The browser may be part of the vehicle entertainment system or remotely connected to the communications network of the vehicle entertainment system. Hyper-Text Transfer Protocol (HTTP) is used as the protocol for transporting the requests and the execution results over the communications network, and so, the programming of the LRUs and the SRUs may be achieved with a standard HTTP server program and the browser may be any HTTP-compliant browser such as Netscape Navigator™ and Internet Explorer™.

21 Claims, 4 Drawing Sheets

VEHICLE ENTERTAINMENT SYSTEM HAVING BUILT-IN TEST ENVIRONMENT SERVER

REFERENCE TO RELATED APPLICATION

This application is related to, and being filed concurrently with, an application by Douglas Infiesto, David Frankenbach, and Joe Winston, entitled "Vehicle Entertainment System Having Seat Controller Cards Programmed to Operate as Both Browser and Server," the contents of which are incorporated herein.

BACKGROUND OF THE INVENTION

1. Field of the Invention

The present invention relates to a vehicle entertainment system, and more particularly, to a vehicle entertainment system in which built-in test environment servers are provided for replaceable units of the vehicle entertainment system to locally manage remote test requests that are transmitted in compliance with HyperText Transport Protocol (HTTP).

2. Description of the Related Art

Hypertext documents are computer files containing text and images with links, more commonly referred to as hyperlinks, to other hypertext documents. The coding language that is used to create hypertext documents is known as HyperText Markup Language (HTML). The protocol for moving hypertext documents across an interconnected network of computers, e.g., across the Internet or an intranet, is known as HyperText Transport Protocol (HTTP). This protocol requires an HTTP client program on one end and an HTTP server program on the other end. The HTTP client program is known as a browser. It is the software that displays hypertext documents and manages inputs thereto. The two most popular types of browsers are Netscape Navigator™ and Internet Explorer™. The communications protocol that is used in the interconnected network of computers, e.g., the Internet or intranet, is Transmission Control Protocol/Internet Protocol (TCP/IP).

Each hypertext document has an address associated therewith. This address is known as a Uniform Resource Locator (URL). Generally, a user requests hypertext documents using the browser by either typing in the URL, or by maneuvering a cursor to a position on the displayed hypertext document that corresponds to a hyperlink to the URL and actuating the mouse button. The latter method is commonly referred to simply as "clicking on the hot-spot" or "clicking on the hyperlink." When the user types in the URL or clicks on the hyperlink, the browser transmits the URL corresponding to the requested hypertext document to an HTTP server computer in which the requested hypertext document resides. The server computer retrieves this document and transmits it back to the browser.

Although the URL is typically associated with a hypertext document, it may be associated with an executable program instead. If a URL that is associated with an executable program is specified by a browser, the server computer in which the executable program resides executes the program using any input data received from the browser, and the output of the program is transmitted back to the browser, typically in the form of a hypertext document.

An in-flight entertainment (IFE) system providing Internet or intranet access is proposed in co-pending U.S. patent application Ser. No. 09/085,180, filed May 26, 1998, entitled "Passenger Entertainment System, Method and Article of Manufacture Having Improved Area Distribution Equipment," the contents of which are incorporated by reference herein. In this system, client computing capabilities are provided at every seat by equipping each seat with an input device (a passenger control unit and a touch screen), an output device (a display unit), and a processor programmed with a browser. The connection to the Internet is provided by a satellite uplink and downlink. The system may also function as an airborne intranet to permit the passenger to select and control product ordering services, passenger services, and entertainment and communications services without connecting to the Internet.

When providing either Internet or intranet access, the above-described system employs a system file server, which is referred to as a cabin file server (CFS) in an IFE system. In the case of Internet access, the CFS functions as a proxy server to manage the connections to other server computers over the Internet. In the case of intranet access, the CFS functions as an HTTP server computer to directly manage requests for hypertext documents and program executions.

In the above-described IFE system, although the Internet or intranet access is available, the testing of the components of the IFE system is not carried out using the Internet or intranet. Rather, a built-in test environment (BITE) tester, which is specially configured to carry out the testing operations on the IFE system, is provided. As a result, none of the advantages of the Internet or intranet access is realized by the IFE system during testing operations. For example, in the above-described IFE system, the operator interface for controlling the BITE tester is customized to the special configurations of the BITE tester and is accessible only at a terminal that is directly interfaced with the BITE tester. The operator interface cannot be accessed from other locations using a standard graphical user interface, such as a browser, even though they are networked with the BITE tester over the Internet or intranet.

A centralized control of the testing operations at the BITE tester is undesirable for two additional reasons. First, when several test requests reach the BITE tester at about the same time, the requests will have to be queued, causing undesirable delays. Second, if the BITE tester is down for maintenance or repair, the BITE tester will be unable to process any pending test requests until the maintenance or repair has been completed.

SUMMARY OF THE INVENTION

An object of the invention is to provide a vehicle entertainment system in which testing of line or shop replaceable units (LRUs or SRUs) is controlled over the Internet or intranet.

Another object of the invention is to provide a vehicle entertainment system in which testing of LRUs and SRUs is decentralized.

Still another object of the invention is to provide an LRU or SRU for a vehicle entertainment system that is programmed to test itself in response to a test request received over a communications network of the vehicle entertainment system.

Yet another object of the invention is to provide a method of testing LRUs and SRUs over the Internet or intranet from a remote location.

The above and other objects of the invention are achieved with a vehicle entertainment system having LRUs and SRUs that are programmed as microservers to receive and carry out test requests that are transmitted from a browser connected to the LRUs/SRUs over a communications network of the vehicle entertainment system. Test results are transmitted back to the browser over the communications network for display. The browser may be a part of the vehicle entertainment system or connected to the communications network of the vehicle entertainment system from a remote location. Hyper-Text Transfer Protocol (HTTP) is used as the protocol for transporting the requests and the execution results over the communications network, and so, the programming of the LRUs and SRUs may be achieved with a standard HTTP server program and the browser may be any HTTP browser such as Netscape Navigator™ and Internet Explorer™.

Additional objects, features and advantages of the invention will be set forth in the description of preferred embodiments which follows.

BRIEF DESCRIPTION OF THE DRAWINGS

The various features and advantages of the present invention may be more readily understood with reference to the following detailed description taken in conjunction with the accompanying drawings, and in which.

The accompanying drawings, which are incorporated in and constitute a part of the specification, illustrate presently preferred exemplary embodiments of the invention, and, together with the general description given above and the detailed description of the preferred embodiments given below, serve to explain the principles of the invention.

DETAILED DESCRIPTION OF THE PREFERRED EMBODIMENTS

In the description provided below, a description of some of the details of a vehicle entertainment system has been omitted for clarity. Such details may be found in the copending U.S. patent application Ser. No. 09/085,180. Further, although an aircraft is depicted, the system according to the invention may be implemented in any vehicle having a passenger entertainment system. Some of the examples include buses, boats, trains, and jet foils.

Figure 1:
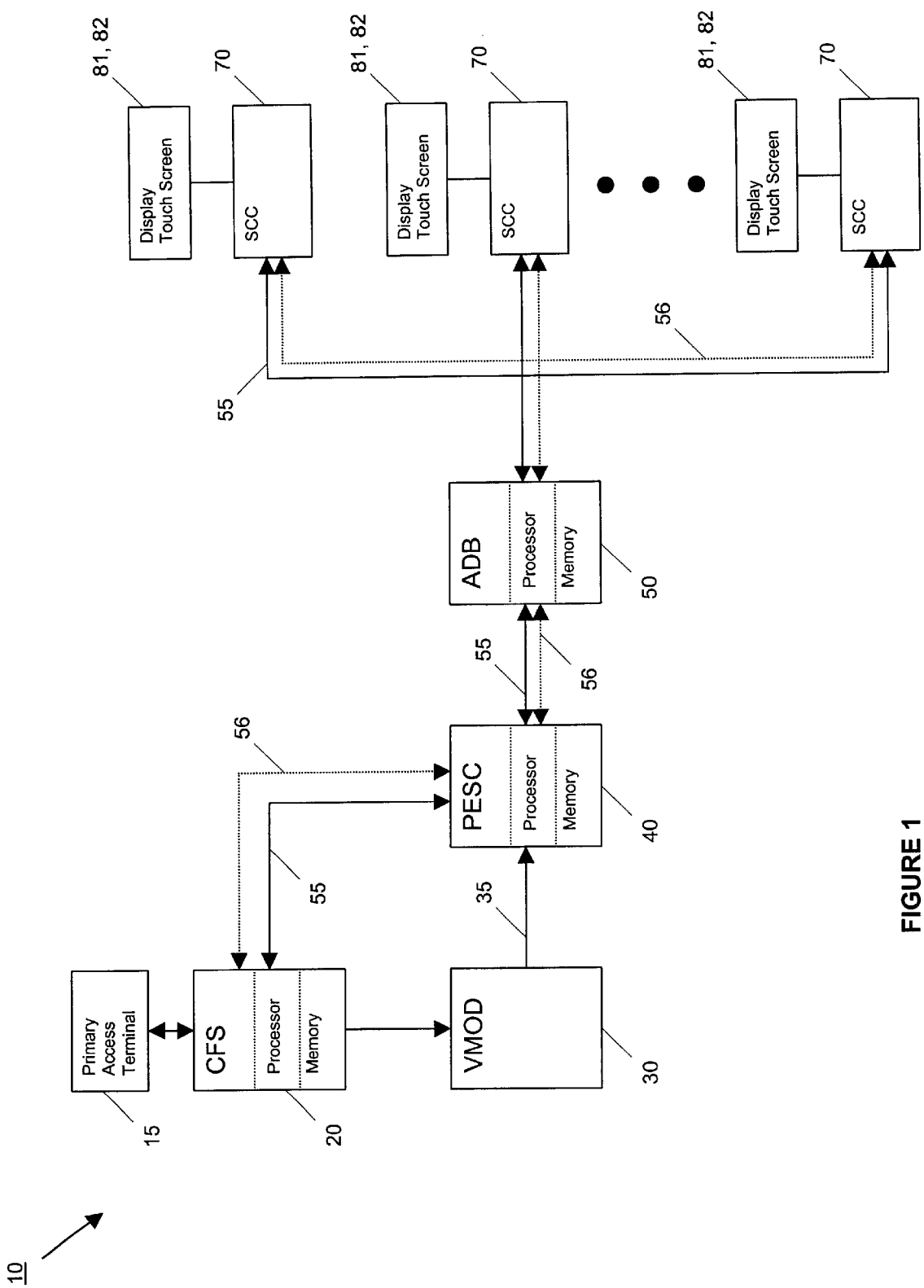
FIG. 1 is a block diagram of a networked IFE system having a plurality of line and shop replaceable units.

FIG. 1 is a block diagram of an in-flight entertainment (IFE) system 10 operating in an intranet environment. The intranet server computer includes a cabin file server (CFS) 20 and the client computers include seat controller cards (SCCs) 70 each having a processor 71 (see FIG. 3) that is programmed with a browser and connected to a display 81 and a touch screen 82. Hypertext documents are displayed on the display 81 and a passenger provides inputs using the touch screen 82. A RF cable network 55 connect the CFS 20 to the SCCs 70.

The CFS 20 may also operate as a client computer when operating in the Internet environment or when one or more of the SCCs 70 are programmed as an HTTP server. For this purpose, a primary access terminal 15 is interfaced with the CFS 20 and the processor of the CFS 20 is programmed with a browser. The primary access terminal 15 typically includes a display and an input device, usually a keyboard and a mouse (or a touch screen). Hypertext documents are displayed on the display of the primary access terminal 15 and a system operator provides inputs using the input device.

Figure 2:
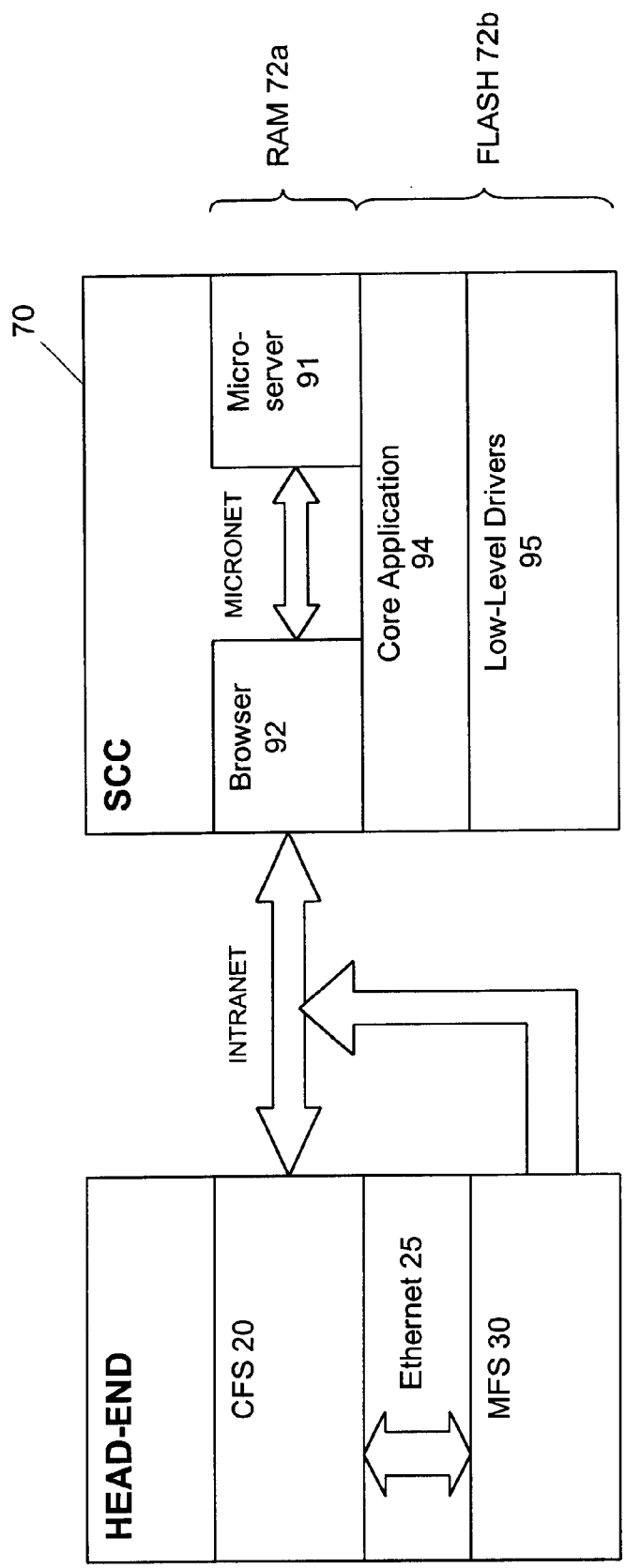
FIG. 2 illustrates software components of a system file server and a seat controller card of the IFE system according to FIG. 1.

In the IFE system 10, a plurality of micronets are configured within the intranet environment. A micronet is illustrated in FIG. 2. It constitutes an HTTP connection between a microserver 91, which operates as the HTTP server program, and a browser 92, which operates as the HTTP client program. The intranet, by contrast, constitutes an HTTP connection between the CFS 20, which operates as the intranet server, and the browser 92. The communications protocol for both the intranet and the micronet is TCP/IP.

The microserver 91 and the browser 92 are two software components of the SCC 70. The microserver 91 constitutes a processor 71 programmed with an HTTP server program and the browser 92 constitutes the processor 71 running an HTTP browser program such as Netscape Navigator™ and Internet Explorer™. The microserver 91 and the browser 92 are preferably stored in a random access memory (RAM) 72a.

The other software components of the SCC 70 include a core application 94 and low-level drivers 95. The core application 94 includes an operating system for the SCC 70 and an application software for managing the low-level drivers 95. The low-level drivers 95 control the hardware components of the SCC 70 and external equipment under control of the passenger, such as overhead lights, headphones, attendant call switch, etc. The core application 94 and the low-level drivers are stored in a flash memory 72b.

Figure 3:
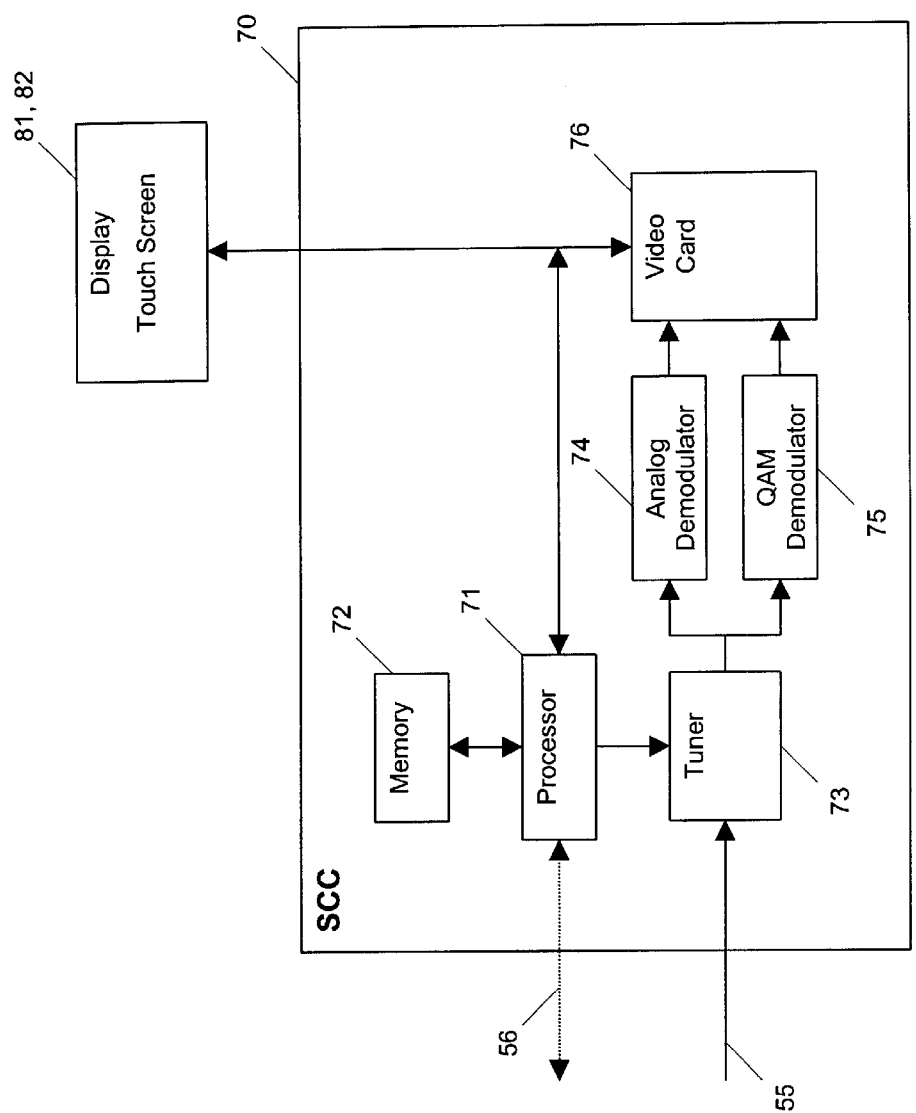
FIG. 3 is a block diagram of a seat controller card of the networked IFE system.
Figure 4:
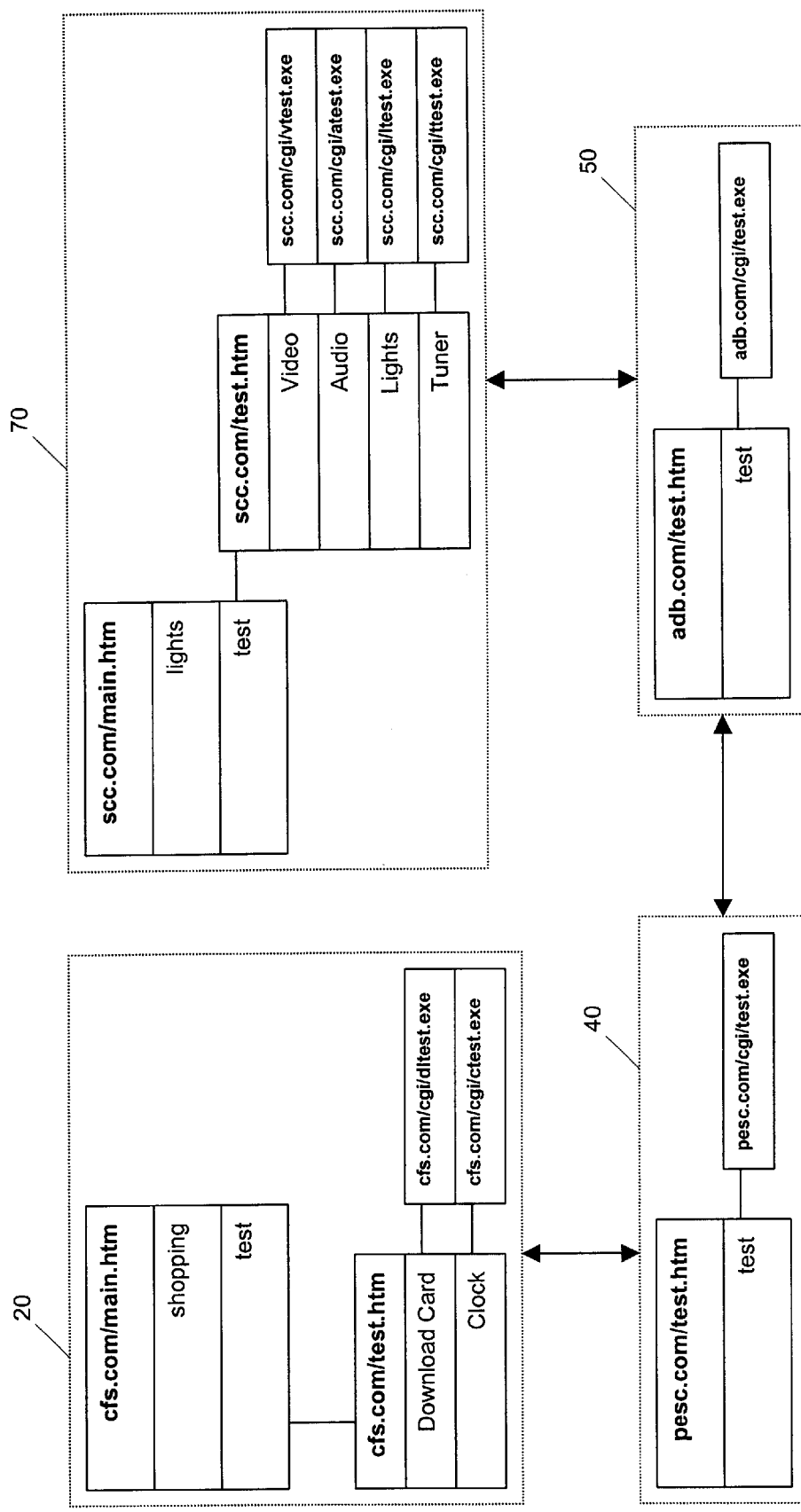
FIG. 4 is a diagram illustrating a hypertext document and one or more executable programs that are stored locally in a line or shop replaceable unit of the networked IFE system.

The RAM 72a and the flash memory 72b are represented as a memory 72 in FIG. 3. The RAM 72a further stores hypertext documents and executable programs that are managed by the microserver 91. They include the home page of the microserver 91 with the URL "scc.com/main.htm" and all other hypertext documents and executable programs having the URL "scc.com" as the root address. Some example of such hypertext documents and executable programs are illustrated in FIG. 4.

FIG. 1 also illustrates a video modulator 30, a passenger entertainment system controller (PESC) 40, and an area distribution box 50. The video modulator 30 is a device that receives multiple RF inputs and modulates the multiple RF inputs into a single RF signal having multiple RF channels. Only a single input from the CFS 20 is shown in FIG. 1 for clarity. The video modulator 30 actually receives other inputs from other devices, such as video cassette players (not shown) and a media file server (not shown). The multi-channel RF signal is supplied to the PESC 40 and the area distribution box 50, and the area distribution box 50 distributes the multi-channel RF signal to the SCCs 70 over the RF cable network 55. A plurality of attenuators and amplifiers (not shown) are arranged in the RF cable network 55 to automatically optimize signal quality under software control. Other functions of the PESC 40 and the area distribution box 50 are described in the co-pending U.S. patent application Ser. No. 09/085,180 and are omitted herein.

At the SCCs 70, a tuner 73 (see FIG. 3) is used to extract a desired channel from the multi-channel RF signal and the extracted signal is either demodulated using an analog demodulator 74 or a QAM demodulator 75. The demodulated output is supplied to a video card 76 which controls the display 81 to display the demodulated output. In addition to the RF cable network 55, a token passing bus network 56 using RS-485 protocol, known as ARCNET, is used to pass control signals between the CFS 20 and the SCCs 70. The ARCNET network 56 is illustrated in FIG. 1 in dotted lines. Through this network, the CFS 20 informs the SCC 70 of the RF channel to which it should tune. This network 56 is also used to transmit browser requests from the SCC 70 to the CFS 20.

Line replaceable units (LRUs) of the vehicle entertainment system 10 comprise the PESC 40 and the area distribution box 50, and shop replaceable units (SRUs) of the vehicle entertainment system 10 comprise the CFS 20 and the SCCs 70. Other LRUs and SRUs, such as audio-visual units, are omitted in FIG. 1 and this description for clarity. In the present invention, each LRU/SRU includes a memory and a processor. The memory of the LRU/SRU contains an executable program having a series of program instructions for testing that LRU/SRU. FIG. 4 shows some examples. The memory of the SCC 70 contains executable programs for testing the display (video), headphones (audio), overhead lights, and the tuner. The memory of the CFS 20 contains therein executable programs for testing the download card and the system clock. The memory of the PESC 40 and the area distribution box 50 contains executable programs for running a diagnostic check of all of the hardware components. The memory of the LRU/SRU further contains a hypertext document that includes a hyperlink to the executable program or programs. This hypertext document is illustrated in FIG. 4 as "cfs.com/test.htm," "pesc.com/test.htm," "adb.com/test.htm," and "scc.com/test.htm" for the CFS 20, the PESC 40, the area distribution box 50, and the SCC 70, respectively.

The processor for the LRU/SRU is programmed with an HTTP server program, i.e., as a microserver, and locally manages any test requests it receives over the ARCNET network 56. This microserver operates as the built-in test environment server for the LRU/SRU. Typically, a test request is initiated using an HTTP browser displayed on the primary access terminal 15. For example, if the system operator desires to run a diagnostic test of the area distribution box 50, the system operator inputs into the browser a URL corresponding to testing of the area distribution box, i.e., "adb.com/test.htm." The browser of the CFS 20 transmits a request for this URL to the area distribution box 50. Since the area distribution box 50 is programmed as a microserver, it is able to receive this request, retrieve this hypertext document from its memory, and deliver the retrieved hypertext document to the primary access terminal 15. As a result, the hypertext document "adb.com/test.htm" is displayed on the primary access terminal 15.

Then, the system operator clicks on the hyperlink "test" (or touches the screen at that location if a touch screen is used) to request the diagnostic test. The browser of the CFS 20 transmits a request for the corresponding URL "adb.com/cgi/test.exe" to the area distribution box 50, which retrieves the executable program, executes it, and returns the execution results to the requestor in the form of a hypertext document. The testing of an LRU/SRU may be initiated using the HTTP browser displayed on the primacy access terminal 15 as illustrated above or it may be initiated from any of the SCCs 70 using the browser programmed therein.

Although the IFE system 10 of FIG. 1 is illustrated as operating in an intranet environment, it may be configured to also have access to the Internet by way of a satellite uplink and downlink in the manner shown in the co-pending U.S. patent application Ser. No. 09/085,180. In such a system, the CFS 20 operates as a proxy server when a URL that is not part of the intranet or the micronet is accessed, e.g., URL that does not have the root address "scc.com" or the root address "cfs.com." In addition, the testing of an LRU/SRU may be initiated from a remote location, e.g., from a computer that is connected to the Internet and to the communication network of the vehicle entertainment system 10 over the satellite uplink and downlink.

A description of a single SCC 70 and a single micronet resident in the SCC 70 has been provided above for clarity. The description of the single SCC 70 and its respective micronet is, however, representative of all other SCCs 70 of the IFE system 10. When all of the SCCs 70 are considered, the resulting IFE system 10 will include a plurality of micronets interconnected over the RF cable and ARCNET networks 55, 56. Also, each SCC 70 will have its own unique address. The URLs of the different SCCs 70 may be distinguished from one another by using a numerical suffix "###" to form the address "scc###.com."

While particular embodiments according to the invention have been illustrated and described above, it will be clear that the invention can take a variety of forms and embodiments within the scope of the appended claims.

We claim:

1. A vehicle entertainment system in which testing of replaceable units is controllable over an intranet and the Internet, comprising:
    a cabin file server; and
    a plurality of replaceable units connected to the cabin file server over a communications network at least one replaceable unit operating as a micronet with a HTTP connection and comprising:
        a processor operating as a microserver programmed with a HTTP server program to manage requests received over the communications network and as a browser with a HTTP browser program to transmit requests over the communications network to the cabin file server; and
        a memory for storing the HTTP server program, the HTTP browser program, hypertext documents and executable programs wherein the processor executes an executable program comprising instructions for testing the at least one replaceable unit in response to a request received over the communications network from the cabin file server and for returning the executable program test results to the cabin file server.

2. The vehicle entertainment system according to claim 1 further comprising a primary access terminal connected to the cabin file server for receiving operator test requests, displaying the test requests and results of the test requests.

3. The vehicle entertainment system according to claim 2, wherein the primary access terminal further comprises:
    an input device for receiving operator test requests to request the test program; and
    a display for displaying hypertext documents for the operator to request a test program and to display the results of the test program.

4. The vehicle entertainment system according to claim 1, wherein said at least one replaceable unit comprises a seat controller card (SCC) said SCC connected to a display with a touch screen for inputs from an operator to the cabin file server to initiate the testing of a replaceable unit.

5. The vehicle entertainment system according to claim 1, wherein said at least one replaceable unit comprises one of a passenger entertainment system controller (PESC) and an area distribution box.

6. The vehicle entertainment system according to claim 1, wherein the hypertext document stored in the memory includes a hyperlink to the test program.

7. The vehicle entertainment system according to claim 1, wherein the cabin file server operates as a proxy server when the vehicle entertainment system is controlled over the Internet by a computer at a remote location connected to the Internet to initiate testing of a replaceable unit.

8. The vehicle entertainment system according to claim 1, wherein the replaceable units comprise a seat controller card (SCC) having core application software and low level drivers connected to external equipment such as overhead lights, headphones, and attendant call switches.

9. The vehicle entertainment system according to claim 1, wherein the memory of a seat controller card contains executable programs for testing a display, headphones, overhead lights, and a tuner, the memory of the cabin file server contains executable programs for testing a download card and a system clock, the memory of a passenger entertainment system controller (PESC) contains executable program for testing PESC hardware components, and the memory of an area distribution box (ADB) contains executable programs for testing ADB hardware components.

10. A vehicle entertainment system comprising a plurality of replaceable units testable over a communications network said communications network comprising an intranet, a replaceable unit being connected to the intranet of the vehicle entertainment system, the replaceable unit configured as a micronet and comprising:
   a memory having stored therein a hypertext test document and an executable test program; and
   a processor programmed as a microserver to manage a test request, received over the intranet from an access terminal external to the replaceable unit, for either the hypertext test document or the executable test program.

11. The vehicle entertainment system according to claim 10, wherein a replaceable unit comprises a cabin file server programmed as a browser for the intranet for transmitting a test request over the intranet.

12. The vehicle entertainment system according to claim 11, wherein the cabin file server comprises executable test programs for testing a download card and a system clock.

13. The vehicle entertainment system according to claim 11 further comprising a primary access terminal connected to the cabin file server for receiving operator test requests, displaying the test requests and results of the test request.

14. The vehicle entertainment system according to claim 13, wherein the primary access terminal further comprises:
   an input device for receiving operator test requests to request the test program; and
   a display for displaying hypertext documents for the operator to request a test program and to display the results of the test program.

15. The vehicle entertainment system according to claim 11, wherein the replaceable unit comprises a seat controller card (SCC) said SCC connected to a display with a touch screen for inputs from an operator to the cabin file server to initiate the testing of a replaceable unit.

16. The vehicle entertainment system according to claim 10, wherein the intranet and the micronet operate with a Hypertext Transport Protocol (HTTP).

17. A method of testing a replaceable unit of a vehicle entertainment system, comprising the steps of:
   programming the replaceable unit as a server;
   storing in the replaceable unit a test program having a series of program instructions for testing the replaceable unit;
   transmitting a request to the replaceable unit from an access terminal external to the replaceable unit;
   executing the test program at the replaceable unit; and
   transmitting the execution results.

18. The method according to claim 17, wherein the step of transmitting the request to the replaceable unit from the access terminal comprises the steps of:
   initiating the request with an HTTP browser displayed on a primary access terminal;
   inputting into the HTTP browser a URL corresponding to testing of the replaceable unit;
   transmitting the URL request to a cabin file server browser; and
   transmitting the URL request from the cabin file server to the replaceable unit.

19. The method according to claim 18, further comprising the steps of:
   receiving the URL request at the replaceable unit;
   retrieving a hypertext document for the test from memory in the replaceable unit;
   delivering the hypertext document to the primary access terminal;
   displaying the hypertext document at the primary access terminal;
   selecting the hypertext document to request the test; and
   transmitting a request for a corresponding URL for the executable test program to the replaceable unit.

20. The method according to claim 18, further comprising the step of clicking on a hyperlink to the test program, wherein the step of transmitting the request to the server is carried out in response to the step of clicking.

21. The method according to claim 17, wherein the step of transmitting the execution results comprises transmitting the execution results in the form of a hypertext document.

* * * * *